(12) United States Patent
Jang

(10) Patent No.: US 8,040,632 B2
(45) Date of Patent: Oct. 18, 2011

(54) GROUNDING STRUCTURE OF TMR AND GMR HEADS WITH A FLYING ON-DEMAND HEATER

(75) Inventor: Eunkyu Jang, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 978 days.

(21) Appl. No.: 12/001,886

(22) Filed: Dec. 12, 2007

(65) Prior Publication Data

US 2009/0154028 A1    Jun. 18, 2009

(51) Int. Cl.
G11B 5/127    (2006.01)
G11B 5/11     (2006.01)
G11B 5/39     (2006.01)

(52) U.S. Cl. ............... 360/125.74; 360/319; 360/317

(58) Field of Classification Search .......... 360/319, 360/317, 125.74, 125.71, 125.31, 125.3, 360/323
See application file for complete search history.

(56) References Cited

U.S. PATENT DOCUMENTS

| | | | |
|---|---|---|---|
| 7,239,488 B2 | 7/2007 | Zhu et al. | |
| 7,436,633 B2* | 10/2008 | Kiyono et al. | 360/317 |
| 7,542,243 B2* | 6/2009 | Lou et al. | 360/294.7 |
| 7,738,214 B2* | 6/2010 | Ohtsu | 360/234.5 |
| 2004/0165305 A1* | 8/2004 | Nishiyama | 360/75 |
| 2006/0198057 A1 | 9/2006 | Leung et al. | |
| 2006/0256481 A1 | 11/2006 | Kagami et al. | |
| 2008/0100970 A1* | 5/2008 | Araki et al. | 360/319 |

* cited by examiner

Primary Examiner — Julie Anne Watko

(57) ABSTRACT

A head for a hard disk drive. The head includes a substrate, a write element, a read element and a heater element. The head also includes a buffer layer between the read element and the substrate, and a first resistor connected to the heater element and the buffer layer. The buffer layer and resistor create an impedance that suppresses noise introduced to the head from the disk of the drive.

15 Claims, 4 Drawing Sheets

GROUNDING STRUCTURE OF TMR AND GMR HEADS WITH A FLYING ON-DEMAND HEATER

BACKGROUND OF THE INVENTION

1. Field of the Invention

The present invention relates to suppressing noise transmitted into a head of a hard disk drive.

2. Background Information

Hard disk drives contain a plurality of magnetic heads that are coupled to rotating disks. The heads write and read information by magnetizing and sensing the magnetic fields of the disk surfaces with separate write and read elements, respectively. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

The disks are rotated by a spindle motor of the drive. Rotation of the disks creates an air flow within the disk drive. Each head has an air bearing surface that cooperates with the air flow to create an air bearing between the head and the adjacent disk surface. The air bearing eliminates or minimizes the mechanical wear between the head and the disk. The height of the air bearing is commonly referred to as the flying height of the head.

The magnetic field detected by the head is inversely proportional to the flying height of the head. Likewise, the strength of the magnetic field written onto the disk is inversely proportional to the fly height. A larger fly height will produce a weaker magnetic field on the disk.

There have been developed heads that include a heater element. Current is provided to the heater element to generate heat and thermally expand the head to move the read and write elements closer to the disk. These types of heads are sometimes referred to as fly on demand ("FOD") heads. The flying height of FOD heads can be varied by changing the amount of power provided to the heater element.

The heads are typically connected to a pre-amplifier circuit by a flexible cable that contains a number of internal conductive traces. For FOD heads there are typically 6 traces, two traces for the write element, two traces for the read element, a trace for the heater element and a ground trace.

Electrical noise, for example an electrostatic discharge, can be transmitted from the disk drive cover/base plate into the heads via the disk. This noise can travel through the head and into the ground and heater element traces of the flexible circuit. In typical flexible circuits, the ground and heater element traces are adjacent to the read traces. The noise on the ground and/or heater element traces can become coupled to the read traces. Noise in the read traces reduces the integrity of the read signal that is provided to the pre-amplifier circuit of the drive.

BRIEF SUMMARY OF THE INVENTION

A head for a hard disk drive. The head includes a substrate, a write element, a read element and a heater element. The head also includes a buffer layer between the read element and the substrate, and a first resistor connected to the heater element and the buffer layer.

DETAILED DESCRIPTION

Disclosed is a head for a hard disk drive. The head includes a substrate, a write element, a read element and a heater element. The head also includes a buffer layer between the read element and the substrate, and a first resistor connected to the heater element and the buffer layer. The buffer layer and resistor create an impedance that suppresses noise introduced to the head from the disk of the drive.

Figure 1:
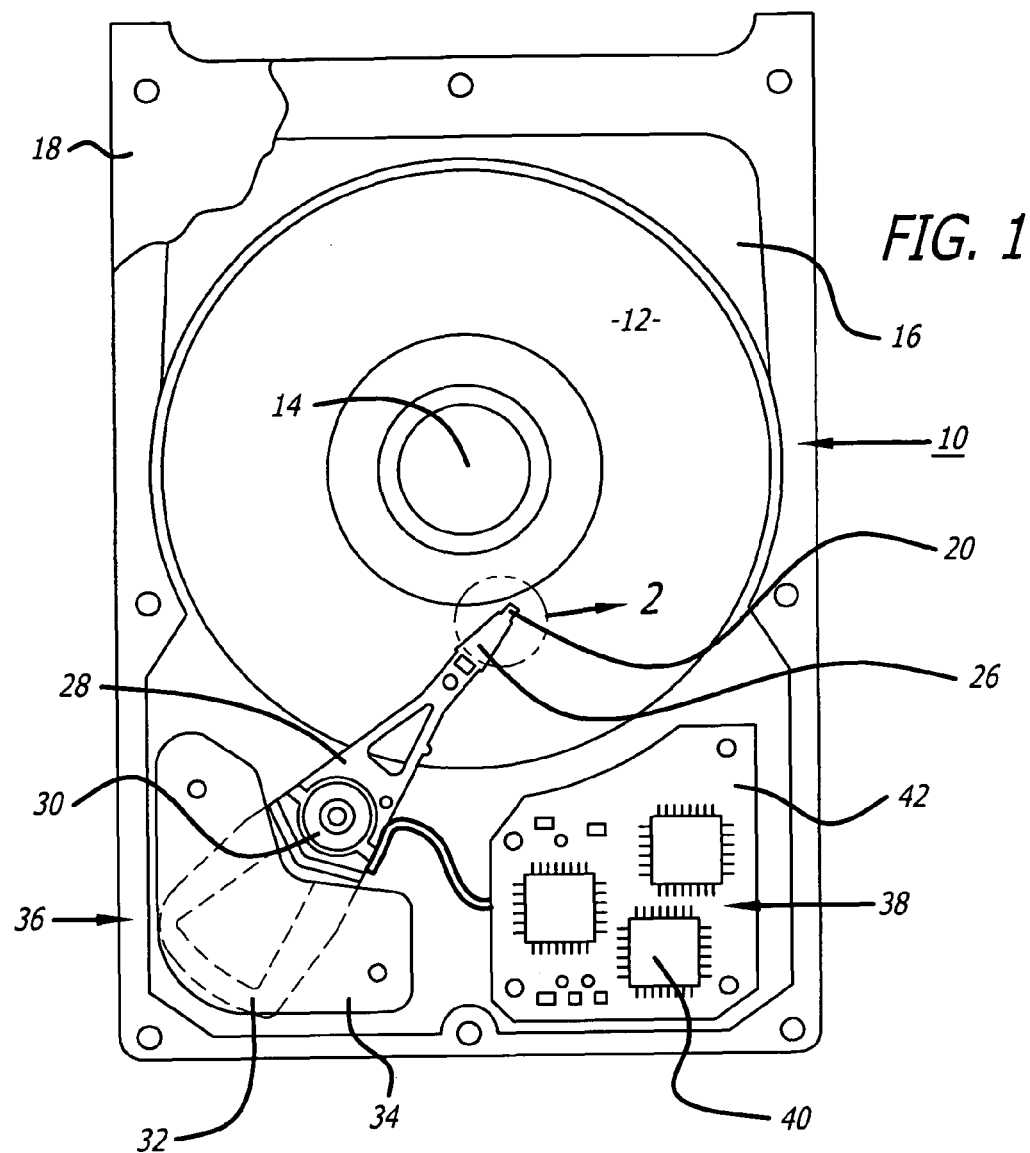
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
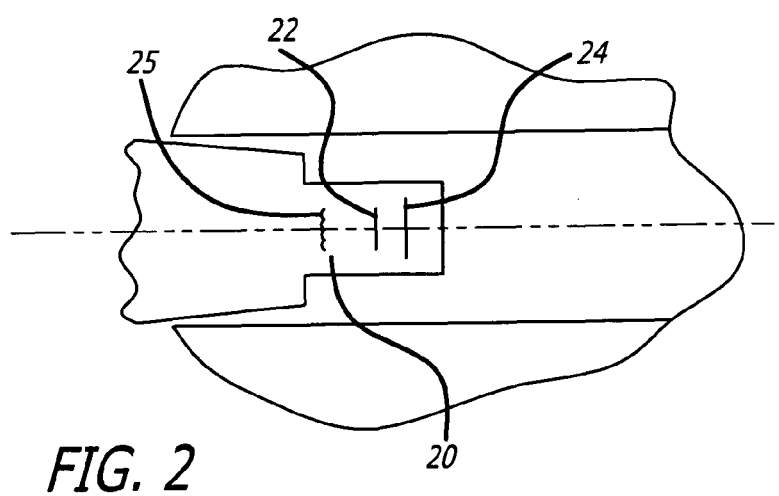
FIG. 2 is a top enlarged view of a head of the hard disk drive.

The disk drive 10 may include a plurality of heads 20 located adjacent to the disks 12. As shown in FIG. 2 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux. The head 20 may be a perpendicular recording head. Each head also has a heater element 25. The heater element 25 may receive current that generates heat in the head. The heat causes the head to thermally expand and varies the fly height. Such heads are commonly referred to fly on demand ("FOD") heads.

Referring to FIG. 1, each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 42 is coupled to the voice coil 32, heads 20 and spindle motor 14 by wires (not shown).

Figure 3:
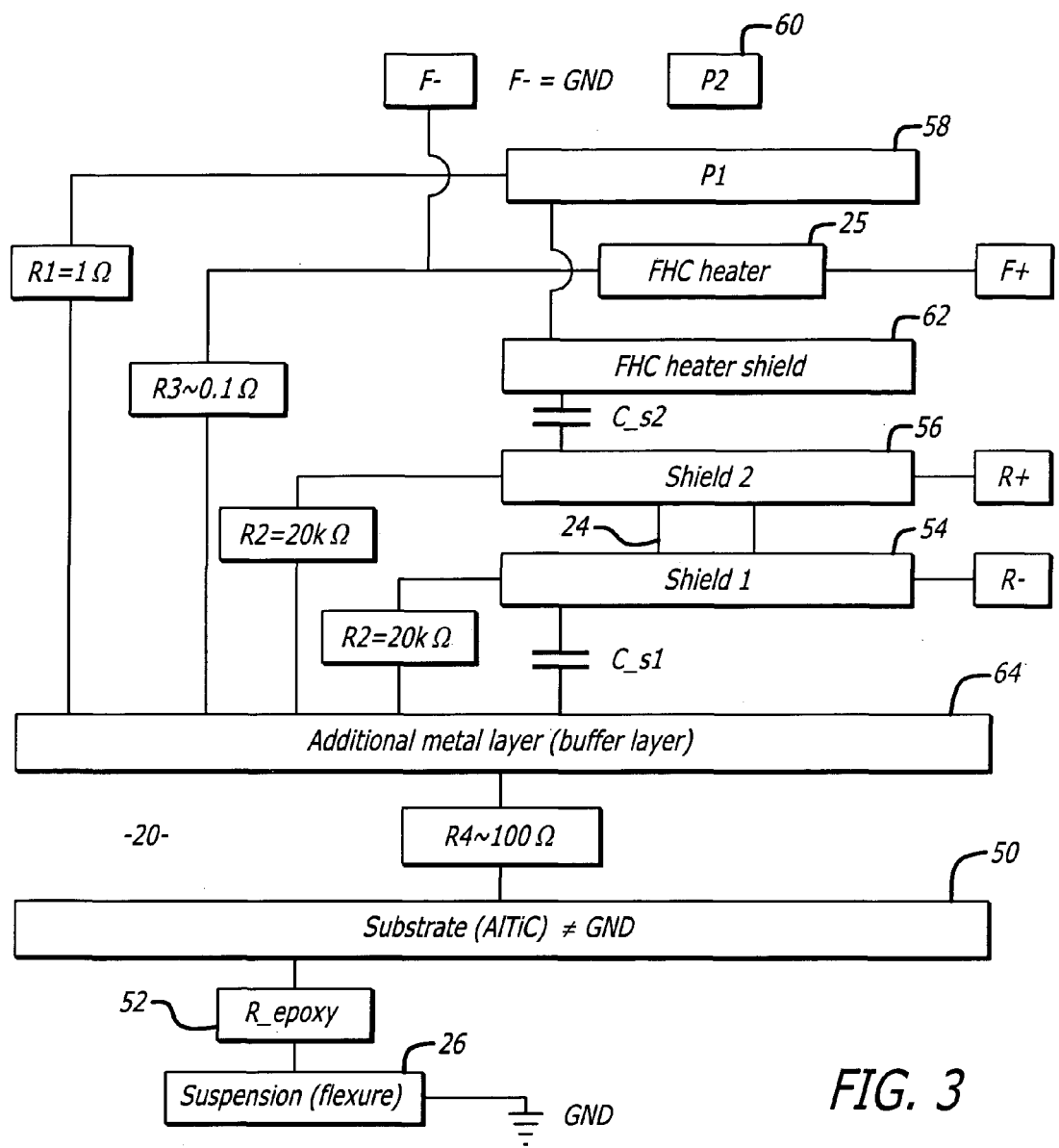
FIG. 3 is a schematic of a head of the hard disk drive.

FIG. 3 shows an illustration of a head 20. The head 20 includes a substrate 50 that may be connected to a suspension arm 26 by an epoxy 52. The epoxy 52 may include an electrically conductive material so that the substrate 50 is electrically connected to ground (GND). The ground may be a "floating" ground. The substrate 50 may be constructed from an electrically conductive material such as AlTiC.

The head 20 includes a read element 24 located between a first read shield 54 and a second read shield 56. The head also includes a pair of magnetic poles 58 and 60 that make up part of the write element as is known in the art. The head 20 also has a write coil (not shown) magnetically coupled to the poles 58 and 60. Located between the read and write elements is a heater element 25. A heater shield 62 may be located between the heater element 25 and the read element 24.

The head 20 includes a conductive buffer layer 64. Resistor R1 is connected to the buffer layer 64 and pole 58. The head may also have a pair of R2 resistors that connect the read shields 54 and 56 to the buffer layer 64.

The heater element 25 is connected to the buffer layer 64 by resistor R3. The buffer layer 64 is connected to the substrate 50 by resistor R4. Exemplary values for the resistors R1, R2, R3 and R4 are provided by FIG. 3. There is also capacitance between the conductive elements including capacitance C_s1 between the read shield 54 and the buffer layer 64, and capacitance C_s2 between read shield 56 and the heater shield 62.

Figure 4:
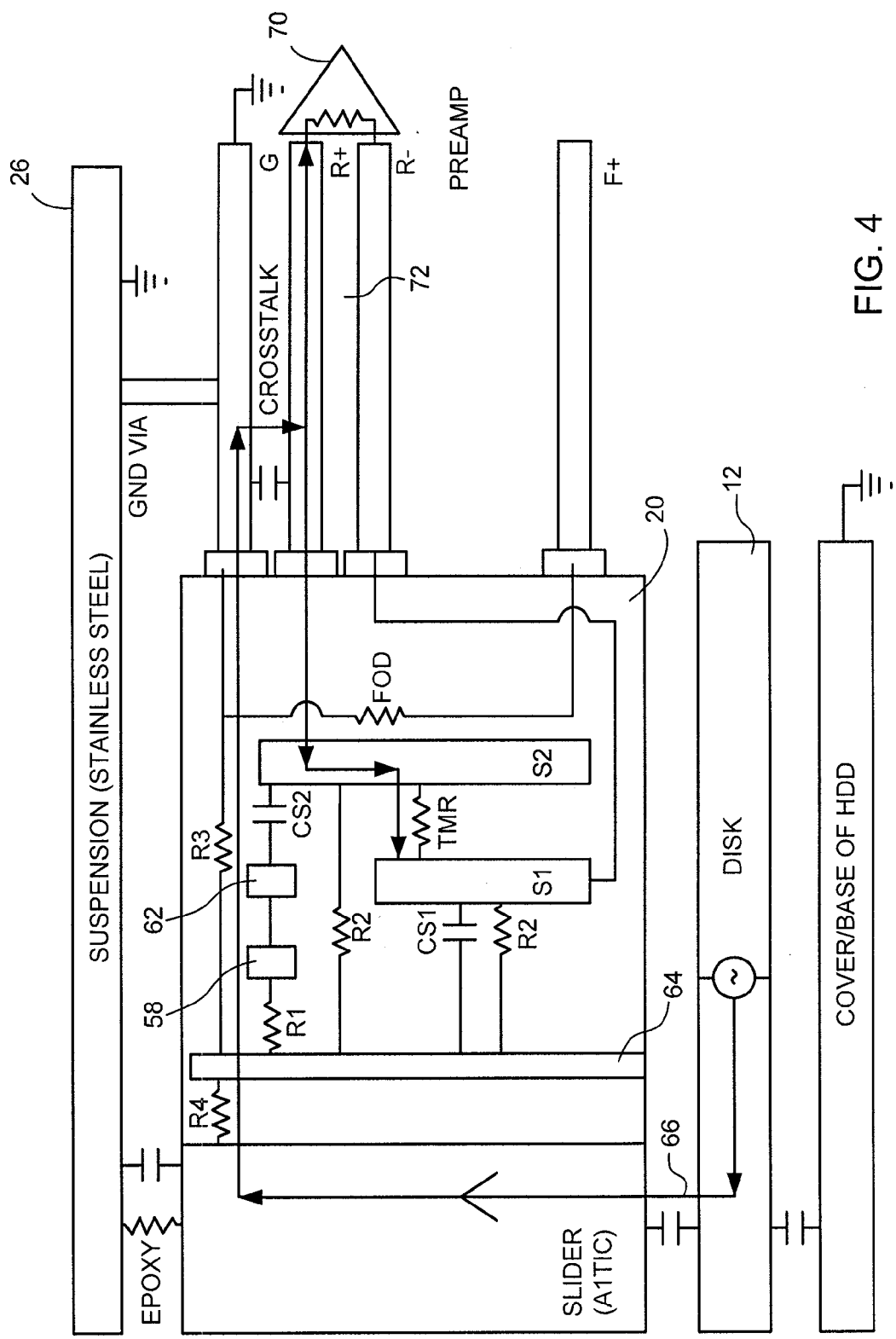
FIG. 4 is a schematic showing the introduction of noise through a disk and into the head.

FIG. 4 shows schematically the flow of electrical noise, designated 66, from a disk 12 into a head 20. The head 20 is connected to a pre-amplifier circuit 70 by conductive traces R+ and R− of a flexible circuit 72. The flexible circuit 72 also has a ground trace G. Noise that travels into the ground trace G may become coupled to the read trace R+ and degrade the quality of the read signal provided to the pre-amplifier circuit 70. The inclusion of the buffer layer 64 with resistors R3 and/or R4 create an impedance that suppresses noise that travels into the head from the disk. By way of example, the RC network shown may have an impedance between 10Ω and 10 kΩ.

Figure 5A:
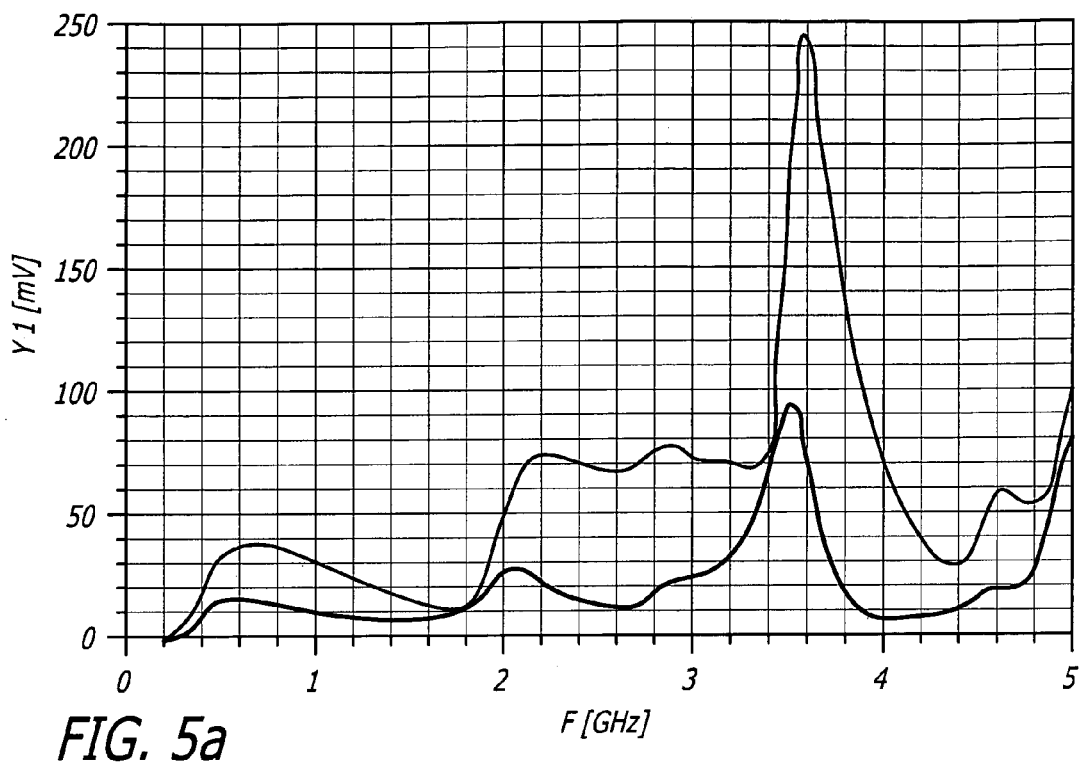
FIGS. 5a-b are graphs showing noise with and without suppression circuitry within the head.
Figure 5B:
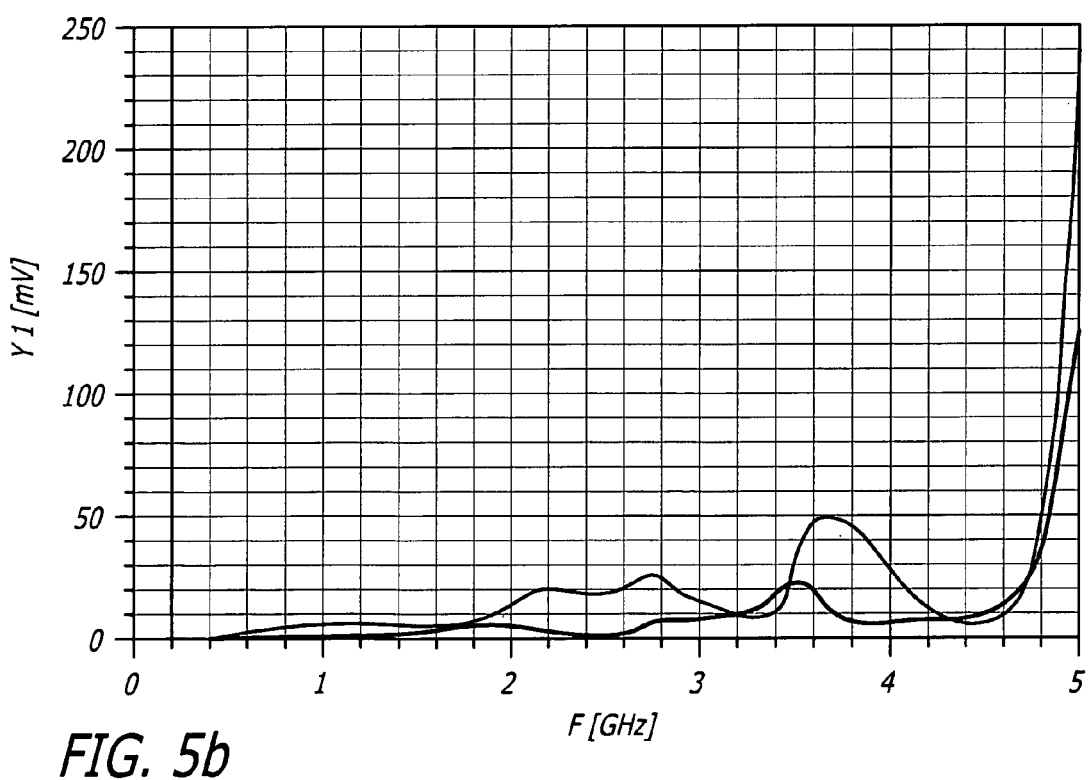

FIGS. 5a and 5b shows the amplitude of noise introduced to the head through the disk. FIG. 5a shows the noise when the head does not have the buffer layer 64 and very low ohmic values (e.g., 0.1). FIG. 5b shows the noise when the head has the buffer layer 64 and resistors R3 and R4 with the ohmic values shown in FIG. 3. As can be seen the noise is significantly attenuated around 2 gigahertz when the head includes the buffer layer and resistors R3 and R4. It is desirable to provide RC values that attenuate noise around 2 gigahertz because this is a typical frequency for noise that is transmitted from the disk to the head.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A head for a hard disk drive, comprising:
   a substrate;
   a write element;
   a read element;
   a heater element;
   a buffer layer between said read element and said substrate; and,
   a first resistor connected to said heater element and said buffer layer.

2. The head of claim 1, further comprising a second resistor connected to said buffer layer and said substrate.

3. The head of claim 2, wherein said first and second resistors have values that damp noise of approximately 2 GHz.

4. The head of claim 1, further comprising a first read shield and a second read shield adjacent to said read element.

5. The head of claim 4, further comprising shield resistors connected to said buffer layer and said first and second read shields.

6. A hard disk drive, comprising:
   a disk;
   a spindle motor coupled to said disk;
   an actuator arm assembly that includes a suspension arm;
   a head that is coupled to said disk and said suspension arm, said head including;
      a substrate;
      a write element;
      a read element;
      a heater element;
      a buffer layer between said read element and said substrate; and,
      a first resistor connected to said heater element and said buffer layer.

7. The disk drive of claim 6, further comprising a second resistor connected to said buffer layer and said substrate.

8. The disk drive of claim 7, wherein said first and second resistors have values that damp noise of approximately 2 GHz.

9. The disk drive of claim 6, further comprising a first read shield and a second read shield adjacent to said read element.

10. The disk drive of claim 9, further comprising shield resistors connected to said buffer layer and said first and second read shields.

11. The disk drive of claim 6, wherein said substrate is electrically connected to said suspension arm.

12. A method for damping noise that is transmitted from a disk into a head of a hard disk drive, comprising:
   providing a head that is coupled to a disk and includes;
      a substrate;
      a write element;
      a read element;
      a heater element;
      a buffer layer between said read element and said substrate;
      a first resistor connected to said heater element and said buffer layer;
   transmitting noise from the disk to the head; and,
   damping the noise within the head.

13. The method of claim 12, wherein the step of providing said head is further characterized as a step of providing said head further comprising a second resistor connected to the buffer layer and the substrate.

14. The method of claim 12, further comprising a step of electrically connecting the substrate to a suspension arm.

15. The method of claim 13, wherein the step of providing the head is further characterized as a step of providing said head wherein the first and second resistors have values for dampening noise of approximately 2 GHz.

* * * * *